United States Patent [19]

Whitehill

[11] Patent Number: 5,400,815

[45] Date of Patent: Mar. 28, 1995

[54] TIMER ACTIVATED IRRIGATION SYSTEM CONTROL

[75] Inventor: Kenneth J. Whitehill, Reno, Nev.

[73] Assignee: Steven R. Whitehill, Cupertino, Calif.

[21] Appl. No.: 91,233

[22] Filed: Jul. 13, 1993

[51] Int. Cl.[6] ............................................. A01G 25/16
[52] U.S. Cl. ................................ 137/78.2; 137/624.12
[58] Field of Search ................. 137/78.2, 78.3, 624.12; 239/70

[56] References Cited

U.S. PATENT DOCUMENTS

| | | |
|---|---|---|
| 2,965,117 | 12/1960 | Gallacher . |
| 3,140,720 | 7/1964 | Griswold ........................ 137/624.12 |
| 3,212,714 | 10/1965 | Davis et al. ......................... 137/78.2 |
| 3,500,944 | 3/1970 | Sanner ................................ 137/78.2 |
| 4,014,359 | 3/1977 | Sanner ................................ 137/78.2 |
| 4,063,605 | 12/1977 | Graham . |
| 4,190,201 | 2/1980 | Geiger . |
| 4,613,764 | 9/1986 | Lobato ............................... 137/78.2 |
| 4,770,345 | 9/1988 | Ross, Jr. et al. . |
| 4,883,200 | 11/1989 | Miller . |
| 4,919,165 | 4/1990 | Lloyd ................................. 137/78.2 |

Primary Examiner—A. Michael Chambers
Attorney, Agent, or Firm—Fliesler, Dubb, Meyer & Lovejoy

[57] ABSTRACT

A control apparatus controls a timer activated irrigation system. A catch pan has a vertically extending wall and a floor. The wall defines a top thereof. The wall and floor define a basin. The catch pan has an overflow construction into which water from the basin can flow. The catch pan is pivotally mounted about a substantially horizontal axis. A biasing structure is adapted to bias a portion of the catch pan spaced from the pivot upwardly. When water in the basin is below a selected depth the upwardly biased portion of the catch pan rotates upwardly into a first orientation. When water in the basin is at least the selected depth the upwardly biased portion of the catch pan rotates downwardly into a second orientation. Water collecting structures collect irrigation water and rain water and deliver them to the basin. A cover structure prevents rain from flowing into the basin other than via the rain collecting structure. A control structure controls the irrigation system so as to replace local cumulative ET by adjustment of frequency of irrigation, lengths of irrigation cycles and/or flow rate of irrigation water during irrigation cycles.

67 Claims, 3 Drawing Sheets

TIMER ACTIVATED IRRIGATION SYSTEM CONTROL

TECHNICAL FIELD

The present invention relates to an irrigation system which is activated by a timer and to a control apparatus for controlling the amount of water distributed by the irrigation system.

BACKGROUND OF THE INVENTION

Irrigation system controllers deliver water for set periods of time on a fixed schedule. The frequency of delivery can be manually adjusted and the time period can be adjusted. For example, the frequency can be set at once every three days and the time period can be set at one hour. This schedule will remain in effect to supply an average need until changed by the user. Also, it is possible to adjust the water flow rate during a water delivery period, i.e., the amount of water being delivered per minute.

If there is a period of cool overcast days with some local showers it may be that the average three day allowable soil moisture depletion will not occur for seven rather than three days following the previous irrigation cycle. Regular fixed irrigation schedules will then overwater, causing delayed plant growth, a boost in fungus growth and a waste of water.

The user can make a guess as to the degree of moisture depletion and adjust manually by changing the frequency or duration of the irrigation cycle, or the rate of delivery of water during an irrigation cycle, but this requires constant monitoring of micro-climate changes and seasonal changes. The soil moisture depletion is measured by and coincides with cumulative evapotranspiration numbers—a measure of the inches of precipitation needed for replacement of the depletion, occurring over a given period of time, usually of a turf grass field as a standard. The desired situation is a matching of the amount of water delivered, whether delivered naturally or by an irrigation system, with the evapotranspiration of a particular field planted with a particular crop (The term crop as used herein includes not only fruit and vegetable products which might be intended for human or animal consumption but also decorative crops such as lawns, shrubs, trees and the like). The prior art has not provided an adequate and inexpensive answer to this problem.

U.S. Pat. No. 4,770,345 to Ross, Jr., et al discloses a simple mechanical system which utilizes a bucket to receive a small portion of the irrigation water flow and to act as a counterweight which shuts off an irrigation valve when sufficient water has been collected in the bucket. The system of this patent will serve to prevent activation of an irrigation system when there is sufficient rain or sufficient into-the-air-sprinkled irrigation water to fill the bucket. The system is exposed and can be readily damaged, for example by vandals. There is no provision for adjusting the rate of evaporation of the captured water and no control of the amount of water which can enter the bucket. It is not adaptable for irrigation systems which do not spray irrigation water into the air but instead flow it through ditches or deliver it below the surface of the soil.

U.S. Pat. No. 4,190,201 of Geiger discloses a misting control that includes a liquid collecting and sensing element that has a screen element which collects only a thin film of water. The sensing element pivots about an axle in response to the presence of the thin film of water and activates or deactivates the misting system via a terminal block.

U.S. Pat. No. 2,965,117 to Gallacher discloses an irrigation control system having a receptacle that is mounted for vertical movement in response to the level of water in the receptacle. Movement of the receptacle is also dependent upon a spring mounted beneath the receptacle. The receptacle is filled when the irrigation system is on via water from a pipe. The receptacle may also be able to collect rain water.

Other arts have utilized pivotally mounted tanks or containers balanced at one end by a spring to determine the level in a tank. U.S. Pat. No. 4,883,200 to Miller, et al and U.S. Pat. No. 4,063,605 to Graham each disclose such systems. Such systems are not used, however, for control of activation of irrigation systems. The Miller, et al patent is concerned with a level indicator for a thermoplastic melting apparatus and the Graham patent is concerned with a level indicator for a fluid power transmission system.

There are two factors which make up evapotranspiration (ET). These factors are evaporation (E) from the soil and from plant surfaces and transpiration (T), i.e., the evaporation that takes place within plant leaves and the vapor that diffuses into the air through the stomata on the leaf surfaces. The ET on any particular day is a function of the weather, season, crop age, crop size and surface roughness. Generally, values for reference evapotranspiration (Eto) are available for different locations throughout the country. The ETo approximates the actual ET of a large field that is not water stressed. ETo can be directly measured but is often calculated from weather data. Other information which is available relates to a crop coefficient (Kc) which will allow values to be determined for the daily evapotranspiration for a particular crop (ETc). The relationship is ETo x Kc is equal to ETc. Publications which discuss the determination of daily reference ETo include Determining Daily Reference Evapotranspiration (ETo), Leaflet 21426, Turfgrass Evapotranspiration Map Central Coast of California, Leaflet 21491, and Estimating Water Requirements Of Landscape Plantings—The Landscape Coefficient Method, Leaflet 21493, all published by the Cooperative Extension University of California, Division of Agriculture and Natural Resources, the contents of each of which is incorporated herein by reference.

It will be noted that the prior art systems for controlling irrigation have generally not been adjustable or designed to take into account the evapotranspiration of a specific region having a specific crop growing thereat.

DISCLOSURE OF INVENTION

The present invention is directed to overcoming one or more of the problems as set forth above.

In accordance with an embodiment of the invention a control apparatus is set forth which controls a timer activated irrigation system. A catch pan has a vertically extending wall and a floor. The wall defines a top thereof. The wall and floor define a basin. The catch pan has an overflow construction into which water from the basin can flow. The catch pan is pivotally mounted about a substantially horizontal axis. A biasing structure is adapted to bias a second portion of the catch pan which is spaced from the pivot upwardly. When water in the basin is below a selected depth the second portion of the catch pan rotates upwardly into a first orientation. When water in the basin is at least the selected depth the second portion of the catch pan rotates downwardly into a second orientation. A rain collecting structure collects rain and delivers it to the basin. An irrigation water collecting structure collects irrigation water and delivers it to the basin. A cover structure prevents rain from flowing into the basin other than via the rain collecting structure. A switching structure has a first mode which permits activation of the irrigation system and a second mode which prevents activation of the irrigation system. The switching structure switches into the first mode when the second portion of the catch pan is in its first orientation and in the second mode when the catch pan is rotated downwardly into the second orientation.

In accordance with another embodiment of the invention a control apparatus is set forth which controls a timer activated irrigation system. A catch pan has a vertically extending wall and a floor. The wall defines a top thereof. The wall and floor define a basin. The catch pan has an overflow construction into which water from the basin can flow. The catch pan is pivotally mounted about a substantially horizontal axis. A biasing structure is adapted to bias a second portion of the catch pan which is spaced from the pivot upwardly. When water in the basin is below a selected depth the second portion of the catch pan rotates upwardly into a first orientation. When water in the basin is at least the selected depth the second portion of the catch pan rotates downwardly into a second orientation. A rain collecting structure collects rain and delivers it to the basin. An irrigation water collecting structure collects irrigation water and delivers it to the basin. A cover structure prevents rain from flowing into the basin other than via the rain collecting structure. A control structure controls the amount of irrigation water delivered by the system as a function of the actual evapotranspiration at an irrigation site. The control structure operates in response to the positioning of the second portion of the catch pan.

Still another embodiment of the invention is an irrigation system controlled by control apparatus of the nature set forth above.

A timer activated irrigation control system which includes a control apparatus in accordance with the present invention provides a number of advantages over prior art devices. First, a relatively simple structure is set forth which can be readily mounted to a post in a field. The apparatus is inexpensive yet can be enclosed so as to protect it from vandalism. It can be readily retrofitted to existing timer controlled irrigation systems. It is equally useful when the irrigation water is delivered above, at or below ground level. Both overwatering and underwatering can be avoided. In accordance with certain embodiments of the present invention the rate of evaporation from the control apparatus can be adjusted so as to properly match evapotranspiration from the particular field where the control apparatus is mounted. All of this allows the amount of irrigating to be automatically adjusted so as to not only minimize water consumption but also to provide a desired amount of watering so that the crop is not damaged due to overwatering. In essence, replenishment of water is conformed to depletion (cumulative ET). This can be accomplished by making evaporation within the device serve as an analog of the evapotranspiration taking place in the field in which it is installed.

BRIEF DESCRIPTION OF DRAWINGS

The invention will be better understood by reference to the figures of the drawings wherein like numbers denote like parts throughout and wherein.

BEST MODE FOR CARRYING OUT INVENTION

Figure 1:
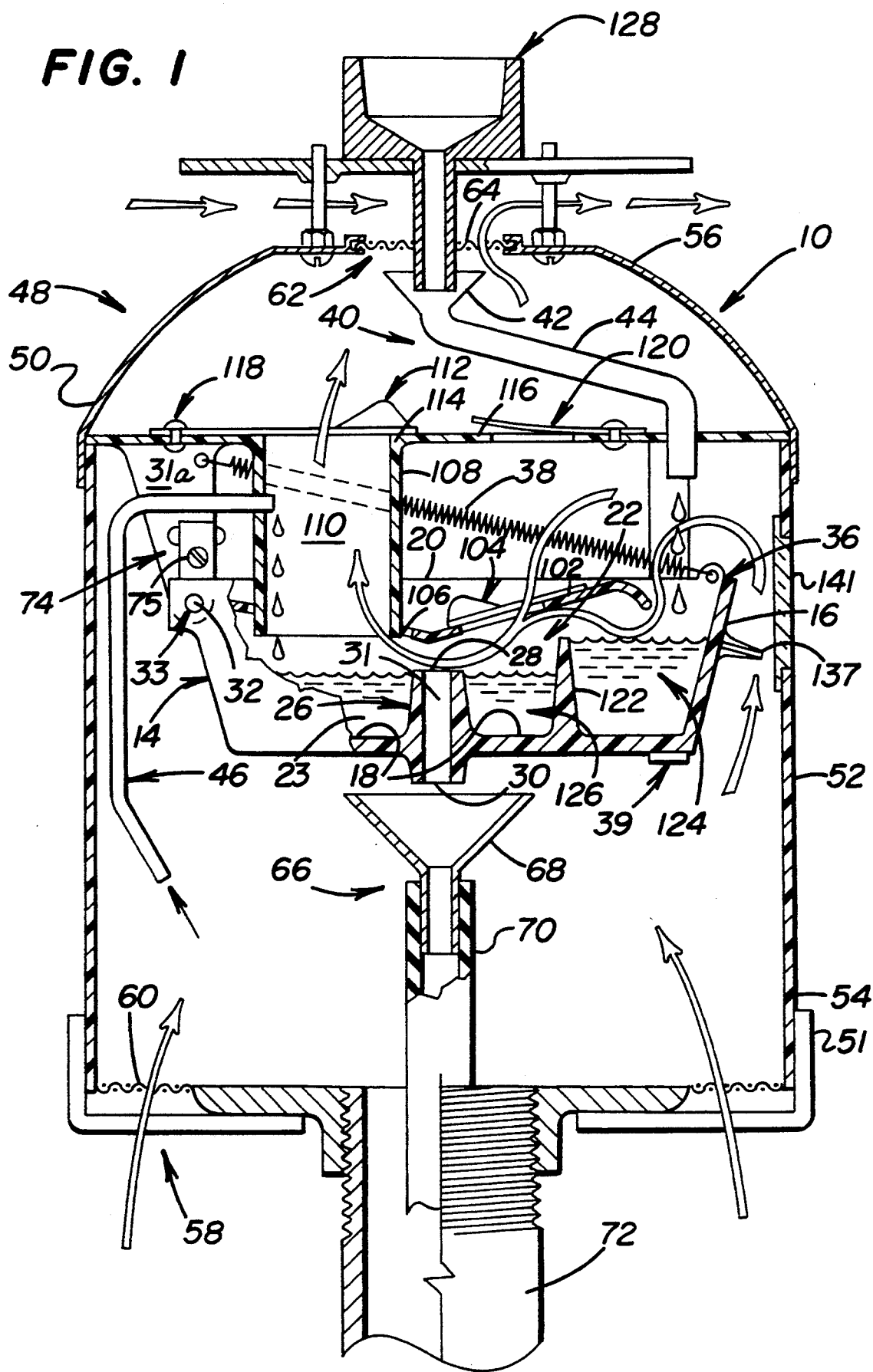
FIG. 1 illustrates, in side sectional view, an embodiment of a control system in accordance with the present invention.
Figure 2:
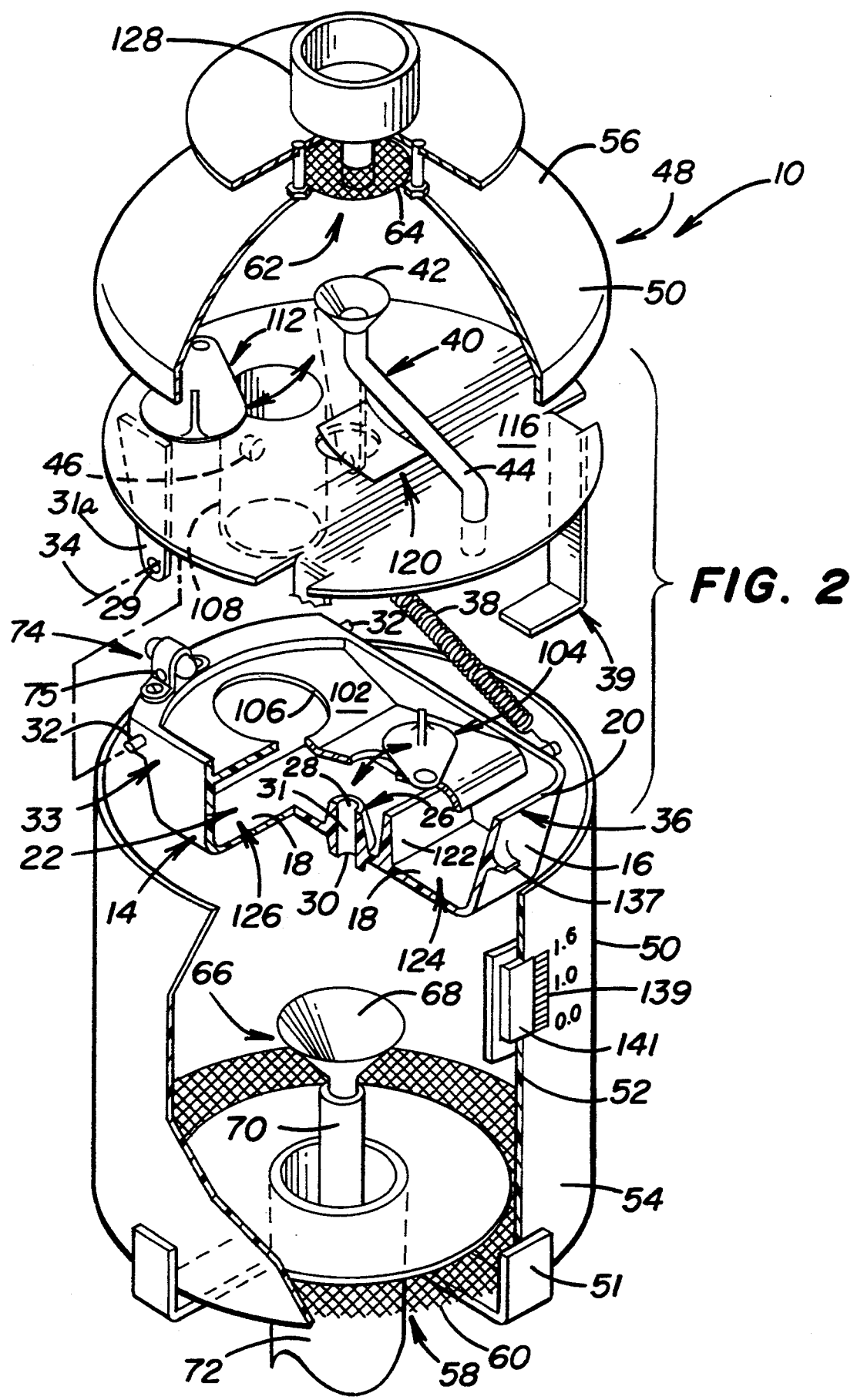
FIG. 2 illustrates, in exploded isometric view, the embodiment of FIG. 1.

Adverting to FIGS. 1 and 2 a control apparatus 10 in accordance with an embodiment of the invention is illustrated. It is useful for controlling a timer activated irrigation system 12 as represented in the schematic diagram shown in FIG. 4. The particular apparatus 10 illustrated act to allow or prevent activation of a timer activated irrigation system 10. However, this is merely exemplary and the invention is not so limited. In particular, the control apparatus 10 can be readily modified so as to control the duration of irrigation cycles and/or the rate of flow of water during such cycles.

The control apparatus 10 comprises a catch pan 14. The catch pan 14 has a vertically extending wall portion 16 and a floor 18. The wall portion 16 extends a selected distance above the floor 18 to define a top 20 of the wall portion 16. The wall portion 16 and the floor 18 define a basin 22, which is preferably divided into two compartments 124 and 126 as is discussed below, which is adapted to receive water 23.

In the embodiment illustrated, an upstanding tubular overflow construction 26 rises above the floor 18 of the catch pan 14. The overflow construction 26 has an open top 28 and an open bottom 30 thereby defining an overflow passage 31. The overflow construction 26 extends vertically above the floor 18 to the open top 28. The open top 28 is located below the top 20 of the wall portion 16. A first portion 33 of the catch pan 14 is pivotally mounted, for example via a pair of oppositely extending pins 32, which fit in holes 29 in a pair of brackets 31 mounted to a plate 116, for pivoting about a substantially horizontal axis 34 (see FIG. 2). A second portion 36 of the catch pan 14 is spaced apart from the first portion 33 of the catch pan 14. Other overflow constructions can also be used. For example, a portion of the wall portion 16 can have a lip on it or a hole through it, or the like, to provide the overflow function. This assures that following irrigation the amount of water in the basin 22, at least to the left of a divider wall 122, is fixed. Also, the basin 22 is rinsed out as water flows through the overflow construction 26 whereby deleterious salt accumulation is prevented.

A biasing structure, in the embodiment illustrated a spring 38, is adapted to bias the second portion 36 of the catch pan 14 upwardly. The biasing structure 38 is of a construction such that when water in the basin 22 causes less than a selected moment (clockwise in FIG. 1) about the axis 34, the second portion 36 of the catch pan 14 rotates upwardly into a first orientation and when water in the basin 22 causes at least the selected moment, the second portion 36 of the catch pan 14 rotates downwardly into a second orientation. Generally, a rest 39 will be provided upon which the second portion 36 of the catch pan 14 can sit so as to protect the spring 38 from exceeding its elastic limit. The rest 39 can be suspended from the plate 116 so that when the plate 116 is removed the catch pan 14 can be removed with it without exceeding the elastic limit of the spring 38.

A rain collecting structure 40 is provided which is adapted for collecting rain from a portion of a selected region and for delivering the rain to the basin 22. In the particular embodiment illustrated the rain collecting structure 40 includes a funnel 42 and a pipe 44 which receive water from a rain collecting cup 128. An irrigation water collecting structure 46 (FIG. 2) is adapted for collecting a portion of the irrigation water during delivery of irrigation water to the region and for delivering the portion of the irrigation water to the basin 22. In the particular embodiment illustrated the irrigation water collecting structure 46 is in the nature of a tube which is positioned to collect the required portion of the irrigation water under line pressure from the irrigation system 12. Should it be desired to delay an irrigation cycle such can readily be accomplished by simply adding water to the basin 22 via the rain collecting structure 40, generally by adding the water to the cup 128.

A cover structure 48 is provided which is of a construction sufficient to prevent rain water from flowing into the basin 22 other than via the rain collecting structure 40. This assures that filling will occur which is proportional to the amount of rain. The cover structure 48 can be darkly colored in order to provide a thermal gradient therethrough and to thereby promote air flow therethrough. In the particular embodiment illustrated the cover structure 48 is in the nature of an enclosure 50 having a wall structure 52 having a lower portion 54 and an upper portion 56. The enclosure 50 has an air entrance 58. In the particular embodiment illustrated the air entrance 58 is provided by having the bottom of the enclosure 50 open except for the presence of a lower screen 60. An air exit 62 is provided in the upper portion 56. In the particular embodiment illustrated the air exit 62 is covered by an upper screen 64 so as to keep dirt and insects out of the interior of the enclosure 50. Note also the partial venturi shape of the enclosure 50 near the air exit 62. This serves to provide suction as wind blows across the air exit 62, thus aiding air flow through the enclosure 50.

In accordance with an embodiment of the invention the enclosure 50 and the catch pan 14 are so aligned and constructed as to direct airflow within the enclosure 50 from the air entrance 58 across the surface of the water present in the basin 22 and out of the air exit 62. This is to provide control of the amount of evaporation from water in the catch pan 14.

Figure 3:
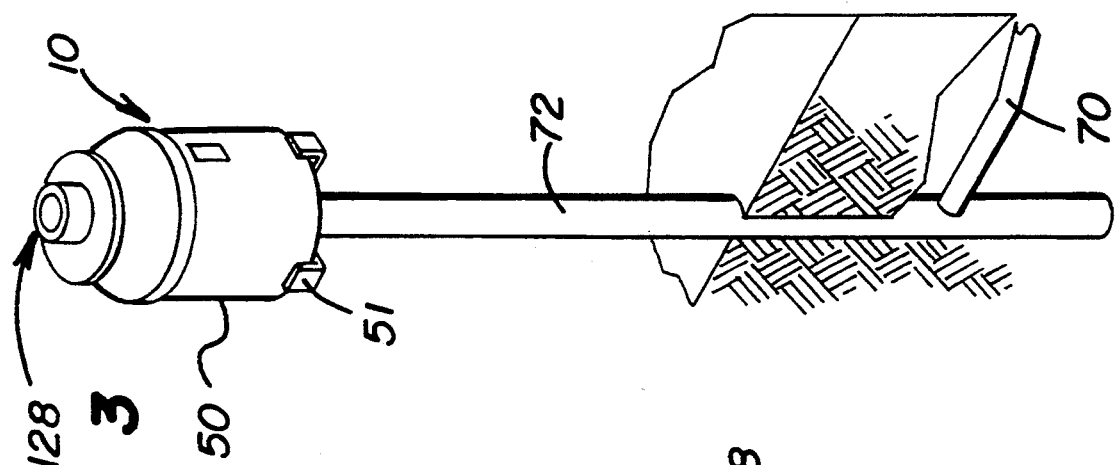
FIG. 3 illustrates, in isometric view, the embodiment of FIGS. 1 and 2 installed in a field.

A drain structure 66 is generally provided for returning water which exits the open bottom 30 of the overflow construction 26 to the environment. The particular structure illustrated includes a funnel 68 which leads to a small diameter tube 70 which passes downwardly through a support structure 72 in the nature of a standing pipe. The support structure 72 serves for supporting the catch pan 14 a selected distance above ground level. In the particular embodiment illustrated the support structure 72 serves for holding the enclosure 50 via brackets 51. The enclosure 50 in turn serves for holding the catch pan 14 at the required location a selected distance above ground level. As can be seen in FIG. 3 the small diameter pipe 70 exits the support structure 72, for example below ground as shown, whereby water which is carried by the small diameter pipe 70 is returned to the environment.

A switching structure 74 forms a control structure part of the illustrated embodiment of the present invention. In the particular embodiment illustrated the switching structure 74 is in the nature of a mercury switch but any of a number of other types of switches can be utilized. For example, a push button or pressure actuated switch can be utilized which is actuated when contacted by the catch pan 14 as it pivots about the horizontal axis 34. The switching structure 74 has a first mode which permits activation of the irrigation system and a second mode which prevents activation of the irrigation system. The switching structure is switched into the first mode in response to the second portion 36 of the catch pan 14 being rotated upwardly into its first orientation. The switching structure is switched into the second mode in response to the second portion 36 of the catch pan 14 being rotated downwardly into its second orientation. It will be clear how this works with a mercury switch since a drop of mercury simply rolls from one position to another as the catch pan 14 is tilted about the horizontal axis 34. The point of activation of the switching structure 74 can be adjusted by loosening appropriate screws 75 and adjusting the positioning and/or angling of the switching structure 74.

Figure 4:
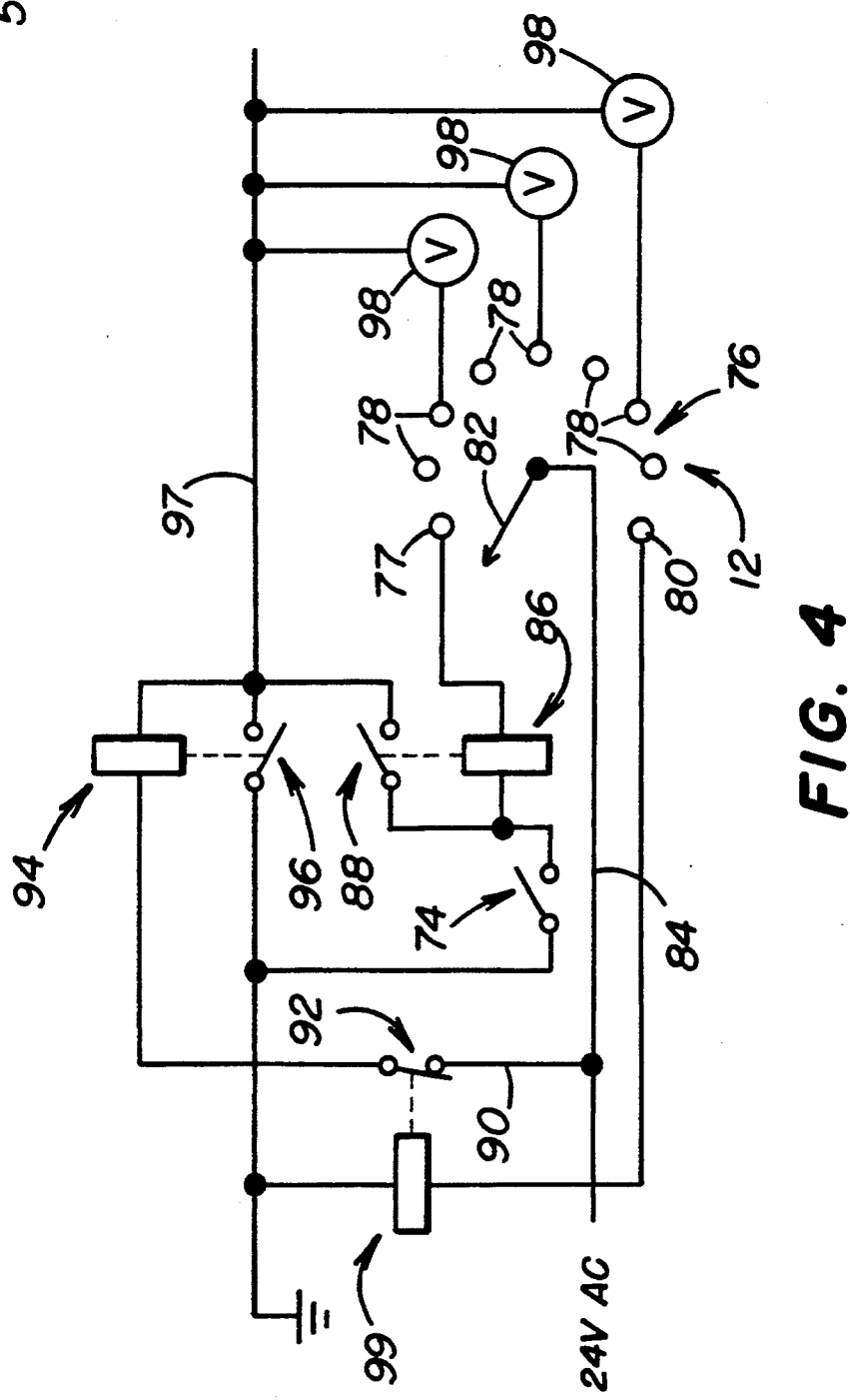
FIG. 4 illustrates timer activated irrigation system circuitry controlled by a control apparatus in accordance with an embodiment of the present invention.

FIG. 4 illustrates the circuitry of irrigation system 12 and the operation of the switch 74 in either permitting activation of the irrigation system 12 or preventing such activation. The irrigation system 12 is of a conventional nature. It includes a clock 76, generally a 24 hour clock, having an ON position 77, a number of valve actuating positions 78 and an OFF position 80. When the clock hand 82 reaches the ON position 77, and if the switch 74 is closed, current passes via conductor 84 and clock hand 82 through solenoid 86 and connects to ground via the closed switch 74. Passage of current through the solenoid 86 leads to closing of a normally open switch 88. With the switch 88 closed current can pass via a line 90 and through a normally closed switch 92 and from thence through a solenoid 94 and through the now closed switch 88 and the closed sensor switch 74 to ground. Passage of current through the solenoid 94 leads to closing of a normally open switch 96. With the switch 96 closed, a ground connection is completed in the line 97 which is connected to provide a ground connection at one side of each of the solenoid valves 98 which control flow of water to irrigation lines. Power passes to the other side of the valves 98 from the line 84 and through the clock hand 82. This connection is made for successive of the valves 98 (only three are shown but additional valves 98 can be connected to other positions 78) as the clock hand 82 moves along the positions 78. When the last of the valves 98 closes delivery of water is stopped. At that time power is still being passed via the line 90 through the switch 92, the solenoid 94 and the switch 96. When the clock hand 82 reaches the OFF position 80 current flows through a solenoid 99 leading to opening of normally closed switch 92, thereby breaking the circuit through the solenoid 94 and allowing the normally open switch 96 to return to the open position.

The sensor switch 74, in accordance with the embodiment of the present invention illustrated in FIG. 4, if it is in its open position as illustrated in FIG. 4, prevents operation of the solenoid 86 to close the switch 88 whereby activation of the entire irrigation system 12 is prevented. Thus, the sensor switch 74 serves to override the activation of the irrigation system and to retain it in a nonoperational state. Accordingly, when the switch 74 is in its closed position it allows activation of the irrigation system 12 and when the switch 74 is in its open position it prevents activation of the irrigation system 12.

A more sophisticated switching structure 74 can be utilized, for example a transducer strain gauge, the output of which can be used to control cycle duration (by controlling the duration of opening of valves such as the valves 98) and/or flow rate (by controlling the degree of opening of valves and/or the speed of water pumps which may be used to provide needed water pressure) during an irrigation cycle and to thereby control the amount of irrigation water being delivered. Indeed, it can at the same time be used to also control the frequency of irrigation cycles in the manner described in detail herein.

A significant feature of the control apparatus 10 of the present invention is that it can include an airflow adjusting system 100 for controlling the amount of air which flows into contact with the water in the basin 22. As discussed above, the air flow is generally driven by wind and thermal (solar) forces. This allows the control apparatus 10 to be adjusted, if desired, to control evaporation therefrom (which is also a function of air temperature and relative humidity) to be at a rate such as to provide irrigation water delivery which is sufficient to replace, but is not significantly greater than that needed for matching, evapotranspiration of water in whatever fields or other regions the control apparatus 10 is operating and for whatever particular crop is being grown in that region.

The drawings illustrate one preferred airflow adjusting system in accordance with the present invention. In the embodiment illustrated in FIGS. 1 and 2 a cover 102 is provided which is mounted to the catch pan 14 in at least partial covering relation to the basin 22. The cover 102 has an air bypass valving structure 104 through it for controlling the amount of air which flows across an exposed surface of the water in the basin 22 and for controlling the relative portions of the air flow which flows over the rain receiving portion 124 and the irrigation water receiving portion 126 of the basin 22 which receive, respectfully, rain water and irrigation water. For example, bypassing air about (or around) portion 124 gives more delay following a rain since the rainwater will evaporate more slowly in such an instance. The cover 102 also has a main air egress hole 106 through it. Air which has flowed across the exposed surface of the water can flow out of the basin 22 via the egress hole 106 and be returned to the surrounding environment.

The airflow adjusting system, in the embodiment illustrated, also includes a tubular member 108 which is mounted to extend downwardly into the air egress hole 106 and which has a lumen 110 through which the air flowing out of the basin 22 mainly passes. An egress valve 112 can be utilized to control the amount of air which can flow through the lumen 110 and thereby to control the overall evaporation rate. In the particular embodiment illustrated a top 114 of the tubular member 108 is connected to and may be integral with the flat plate 116. The lumen 110 of the tubular member 108 is, as will be seen, not blocked off by the plate 116. The egress valve 112 is pivotally mounted at 118 and can be utilized to partially close off the lumen 110 thereby controlling airflow. A pressure release bypass valve 120 is provided in the plate 116 and can be in the nature of a simple flap valve. Air which does not flow across the surface of the water in the basin 22 can flow through the bypass valve 120 and be returned to the environment.

Preferably the catch pan 14 includes a divider wall 122 which separates the basin 22 into the rainwater receiving portion 124 and the irrigation water receiving portion 126. The divider wall 122 extends from the floor 18 to above the open top 28 of the overflow construction 26. The relative sizes of the basin 22 on each side of the divider wall 122, and the height of the divider wall 122, can be selected to provide the desired replacement of water evapotranspired from the area or region in which the control apparatus 10 is located.

In operation the control apparatus 10 can be set up in a field in the manner illustrated in FIG. 3. Electrical wires which connect to the sensor 74 can conveniently be led off either externally or internally of the support structure 72 and connected to the irrigation system 12. When rain occurs a cup 128 collects rain water and delivers it to the basin 22 via the funnel 42 and pipe 44. As will be noted by reference to FIGS. 1 and 2, the water is delivered to one side of the divider wall 22. When irrigation is taking place a portion of the irrigation water is led, for example via a valve such as one of the valves 98 shown in FIG. 4, and then via the tube 46 to the other side of the divider wall 122. If during irrigation and/or rainfall the water level rises above the open top 28 of the overflow construction 26 it flows downwardly through the funnel 68 and the small diameter drainpipe 70 and is returned to the environment. When the basin 22 is filled from the irrigation system 12 the water 23 to the left of the divider wall 122 extends to the open top 28 of the overflow construction 26. This may or may not be the case when rainfall occurs. Note the larger moment of the rainwater due to its further distance from the axis 34. There may be instances wherein the irrigation system 12 has not been allowed to operate because of sufficient rain, in which case the water level to the left of the divider wall 122 is not necessarily up to the top of the overflow construction 26 and, indeed, is not necessarily present. The exact positioning of the divider wall 122 can be adjusted as is appropriate. The system is set up so that if only the portion of the basin 22 on one side (left or right) of the divider wall 122 is filled with water the catch pan 14 will be sufficiently tilted by the presence of water so that the switch 74 will be open. Less than a full load of water to the right of the divider wall 122 may also be made sufficient to open the switch 74.

A pointer 137 mounted to and moving with the catch pan 14, an evapotranspiration scale 139 and a transparent window 141 are generally provided to allow visual adjustment and calibration to give a desired cumulative ET number matching following each irrigation cycle. The indication provided by the pointer 137 and scale 139 indicates cumulative ET and thus when the water depleted from the soil needs to be replaced or how much replacement water is needed. The various valves can be adjusted to match the indicated ET to local conditions. For example, if the local conditions are such that the change in ET (actual average ET values for various regions are generally available from local or state government sources on about a weekly basis) per day is 0.2, the evaporation from within the control apparatus can be adjusted so as to provide enough irrigation to match this value. Indeed, if the immediate vicinity of the control apparatus is known by the person adjusting it to be experiencing a greater or lesser ET than the actual average ET value for the greater local region, an appropriate adjustment can be made. The pointer 137 and scale 139 will then indicate the real local ET rate.

The amount of irrigation water used to replace depletion depends upon the frequency of irrigation cycles, the duration of such cycles and the rate of flow of water during the cycles. In the particular embodiment illustrated in the drawings control is exercised over the frequency of the cycles with their duration and the flow rate being unchanged. As discussed above, one or more of these three variables can be controlled using the control apparatus of the invention which, in essence, measures cumulative local ET and controls irrigation water delivery to match the cumulative local ET.

Air flow is also illustrated in FIG. 1. As will be noted air flows through the enclosure 50 and follows the path shown by the various arrows. Adjustment of the various valves controls the amount of air flowing over the surface of the water 23 in the basin 22. In this manner the amount of evaporation which takes place from the basin 22 can be controlled as desired. In the embodiment illustrated the relative evaporation rates from the rain receiving portion 124 and the irrigation water receiving portion 126 of the basin 22 can be adjusted via adjustment of the air bypass valving structure 104. Generally, such control will be adjusted so that the irrigation water delivery is sufficient to replace but not significantly exceed crop evapotranspiration of water at the selected region for a crop growing at the selected region. This automatically takes both irrigation and the amount of rainfall into account.

Industrial Applicability

The present invention provides a control apparatus 10 for a timer activated irrigation system 12 whereby water use is controlled and can be optimized for particular crops and for particular regions of use.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A control apparatus for controlling a timer activated irrigation system, the control apparatus comprising:

a catch pan, the catch pan having a vertically extending wall portion and a floor, the wall portion extending a selected distance above the floor to define a top of the wall portion, the wall portion and the floor defining a basin adapted to receive water, the catch pan having an overflow construction having an open top above the floor into which water from the basin can flow, a first portion of the catch pan being pivotally mounted for pivoting about a substantially horizontal axis and a second portion of the catch pan being spaced apart from the first portion;

a biasing structure adapted to bias the second portion of the catch pan upwardly, the biasing structure being of a construction such that when water in the basin is below a selected depth the second portion of the catch pan rotates upwardly into a first orientation and when water in the basin is at least the selected depth the second portion of the catch pan rotates downwardly into a second orientation;

a rain collecting structure adapted for collecting rain from a portion of a selected region and for delivering the rain to the basin;

an irrigation water collecting structure adapted for collecting a portion of irrigation water during delivery of irrigation water to the region when it is being irrigated and for delivering the portion of the irrigation water to the basin;

a cover structure of a construction sufficient to prevent rain water from flowing into the basin other than via the rain collecting structure; and a control structure adapted to control the amount of irrigation water delivered by the system as a function of the actual evapotranspiration at an irrigation site, the control structure operating in response to the positioning of the second portion of the catch pan.

2. An apparatus as set forth in claim 1, further including:

an airflow adjusting system for controlling the amount of air which flows into contact with the water in the basin.

3. An apparatus as set forth in claim 2, wherein the airflow adjusting system includes:

a cover mounted to the catch pan in at least partial covering relation to the basin, the cover having an incoming air valving structure therethrough for controlling the amount of air which flows into the basin and across an exposed surface of the water in the basin and a main air egress hole through which air flows out of the basin and is returned to the surrounding atmosphere, the incoming air valving structure extending through the cover.

4. An apparatus as set forth in claim 3, wherein the airflow adjusting system further includes:

a tubular member mounted to extend downwardly into said air egress hole and having a lumen through which the air flowing out of the basin can flow;

an egress valve controlling the amount of air which can flow through the lumen; and a bypass valve through which air can flow and be returned to the atmosphere without passing across the surface of the water in the basin.

5. An apparatus as set forth in claim 2, further including:

an indicator structure of a construction sufficient and arranged to indicate the cumulative ET reading at the selected region.

6. An apparatus as set forth in claim 5, wherein the airflow adjusting system is adjusted by reference to the indicator structure so as to provide irrigation water delivery sufficient to replace but not significantly exceed crop evapotranspiration of water at the selected region for a crop growing at the selected region.

7. An apparatus as set forth in claim 6, wherein the catch pan further includes a divider wall separating the basin into a rain water receiving portion and an irrigation water receiving portion, the divider wall extending from the floor to above the open top of the overflow construction, the relative sizes of the basin on each side of the divider wall and the height of the divider wall being selected to provide the desired replacement of water evapotranspired from the selected region.

8. An apparatus as set forth in claim 7, wherein the overflow construction communicates with the irrigation water receiving portion of the basin.

9. An apparatus as set forth in claim 8, wherein the airflow adjusting system is adjusted so as to control the relative rates of evaporation from the rain water receiving portion and from the irrigation water receiving portion of the catch pan.

10. An apparatus as set forth in claim 7, wherein the airflow adjusting system is adjusted so as to control the relative rates of evaporation from the rain water receiving portion and from the irrigation water receiving portion of the catch pan.

11. An apparatus as set forth in claim 2, wherein the cover structure comprises:
- an enclosure having a wall structure having a lower portion and an upper portion, the enclosure having an air entrance in the lower portion and an air exit in the upper portion; and wherein:
- the enclosure and the catch pan are so aligned and constructed as to direct air flow within the enclosure from the air entrance, across the surface of water present in the basin and out the air exit.

12. An apparatus as set forth in claim 11, wherein the airflow adjusting system includes:
- a cover mounted to the catch pan in at least partial covering relation to the basin, the cover having an incoming air valving structure therethrough for controlling the amount of air which flows into the basin and across an exposed surface of the water in the basin and a main air egress hole through which air flows out of the basin and is returned to the surrounding atmosphere, the incoming air valving structure extending through the cover.

13. An apparatus as set forth in claim 12, wherein the airflow adjusting system further includes:
- a tubular member mounted to extend downwardly into said air egress hole and having a lumen through which the air flowing out of the basin can flow;
- an egress valve controlling the amount of air which can flow through the lumen; and
- a bypass valve through which air can flow and be returned to the atmosphere without passing across the surface of the water in the basin.

14. An apparatus as set forth in claim 11, further including:
- an indicator structure of a construction sufficient and arranged to indicate the cumulative ET reading at the selected region.

15. An apparatus as set forth in claim 14, wherein the airflow adjusting system is adjusted by reference to the indicator structure so as to provide irrigation water delivery sufficient to replace but not significantly exceed crop evapotranspiration of water at the selected region for a crop growing at the selected region.

16. An apparatus as set forth in claim 15, wherein the catch pan further includes a divider wall separating the basin into a rain water receiving portion and an irrigation water receiving portion, the divider wall extending from the floor to above the open top of the overflow construction, the relative sizes of the basin on each side of the divider wall and the height of the divider wall being selected to provide the desired replacement of water evapotranspired from the selected region.

17. An apparatus as set forth in claim 16, wherein the overflow construction communicates with the irrigation water receiving portion of the basin.

18. An apparatus as set forth in claim 17, wherein the airflow adjusting system is adjusted so as to control the relative rates of evaporation from the rain water receiving portion and from the irrigation water receiving portion of the catch pan.

19. An apparatus as set forth in claim 16, wherein the airflow adjusting system is adjusted so as to control the relative rates of evaporation from the rain water receiving portion and from the irrigation water receiving portion of the catch pan.

20. An apparatus as set forth in claim 1, wherein the cover structure comprises:
- an enclosure having a wall structure having a lower portion and an upper portion, the enclosure having an air entrance in the lower portion and an air exit in the upper portion; and wherein:
- the enclosure and the catch pan are so aligned and constructed as to direct air flow within the enclosure from the air entrance, across the surface of water present in the basin and out the air exit.

21. An apparatus as set forth in claim 1, further including:
- a drain structure for returning water which exits the overflow construction to the environment.

22. An apparatus as set forth in claim 1, further including:
- a support structure for supporting the catch pan a selected distance above ground level.

23. A timer activated irrigation system which comprises:
- a timing mechanism adapted to activate one or more valves on a timed basis to deliver irrigation water; and
- a control apparatus comprising:
- a catch pan, the catch pan having a vertically extending wall portion and a floor, the wall portion extending a selected distance above the floor to define a top of the wall portion, the wall portion and the floor defining a basin adapted to receive water, the catch pan having an overflow construction having an open top above the floor into which water from the basin can flow, a first portion of the catch pan being pivotally mounted for pivoting about a substantially horizontal axis and a second portion of the catch pan being spaced apart from the first portion;
- a biasing structure adapted to bias the second portion of the catch pan upwardly, the biasing structure being of a construction such that when water in the basin is below a selected depth the second portion of the catch pan rotates upwardly into a first orientation and when water in the basin is at least the selected depth the second portion of the catch pan rotates downwardly into a second orientation;
- a rain collecting structure adapted for collecting rain from a portion of a selected region and for delivering the rain to the basin;
- an irrigation water collecting structure adapted for collecting a portion of irrigation water during delivery of irrigation water to the region when it is being irrigated and for delivering the portion of the irrigation water to the basin;

a cover structure of a construction sufficient to prevent rain water from flowing into the basin other than via the rain collecting structure; and a switching structure having a first mode which permits activation of the irrigation system and a second mode which prevents activation of the irrigation system, the switching structure being switched into the first mode in response to the second portion of the catch pan being rotated upwardly into the first orientation and into the second mode in response to the second portion of the catch pan being rotated downwardly into the second orientation.

24. An apparatus as set forth in claim 23, further including:

an airflow adjusting system for controlling the amount of air which flows into contact with the water in the basin.

25. An apparatus as set forth in claim 24, wherein the airflow adjusting system includes:

a cover mounted to the catch pan in at least partial covering relation to the basin, the cover having an incoming air valving structure therethrough for controlling the amount of air which flows into the basin and across an exposed surface of the water in the basin and a main air egress hole through which air flows out of the basin and is returned to the surrounding atmosphere, the incoming air valving structure extending through the cover.

26. An apparatus as set forth in claim 25, wherein the airflow adjusting system further includes:

a tubular member mounted to extend downwardly into said air egress hole and having a lumen through which the air flowing out of the basin can flow;

an egress valve controlling the amount of air which can flow through the lumen; and a bypass valve through which air can flow and be returned to the atmosphere without passing across the surface of the water in the basin.

27. An apparatus as set forth in claim 24 further including:

an indicator structure of a construction sufficient and arranged to indicate the cumulative ET reading at the selected region.

28. An apparatus as set forth in claim 27, wherein the airflow adjusting system is adjusted by reference to the indicator structure so as to provide irrigation water delivery sufficient to replace but not significantly exceed crop evapotranspiration of water at the selected region for a crop growing at the selected region.

29. An apparatus as set forth in claim 28, wherein the catch pan further includes a divider wall separating the basin into a rain water receiving portion and an irrigation water receiving portion, the divider wall extending from the floor to above the open top of the overflow construction, the relative sizes of the basin on each side of the divider wall and the height of the divider wall being selected to provide the desired replacement of water evapotranspired from the selected region.

30. An apparatus as set forth in claim 29, wherein the overflow construction communicates with the irrigation water receiving portion of the basin.

31. An apparatus as set forth in claim 30, wherein the airflow adjusting system is adjusted so as to control the relative rates of evaporation from the rain water receiving portion and from the irrigation water receiving portion of the catch pan.

32. An apparatus as set forth in claim 29, wherein the airflow adjusting system is adjusted so as to control the relative rates of evaporation from the rain water receiving portion and from the irrigation water receiving portion of the catch pan.

33. An apparatus as set forth in claim 24, wherein the cover structure comprises:

an enclosure having a wall structure having a lower portion and an upper portion, the enclosure having an air entrance in the lower portion and an air exit in the upper portion; and wherein:

the enclosure and the catch pan are so aligned and constructed as to direct air flow within the enclosure from the air entrance, across the surface of water present in the basin and out the air exit.

34. An apparatus as set forth in claim 33, wherein the airflow adjusting system includes:

a cover mounted to the catch pan in at least partial covering relation to the basin, the cover having an incoming air valving structure therethrough for controlling the amount of air which flows into the basin and across an exposed surface of the water in the basin and a main air egress hole through which air flows out of the basin and is returned to the surrounding atmosphere, the incoming air valving structure extending through the cover.

35. An apparatus as set forth in claim 34, wherein the airflow adjusting system further includes:

a tubular member mounted to extend downwardly into said air egress hole and having a lumen through which the air flowing out of the basin can flow;

an egress valve controlling the amount of air which can flow through the lumen; and a bypass valve through which air can flow and be returned to the atmosphere without passing across the surface of the water in the basin.

36. An apparatus as set forth in claim 33, further including:

an indicator structure of a construction sufficient and arranged to indicate the cumulative ET reading at the selected region.

37. An apparatus as set forth in claim 36, wherein the airflow adjusting system is adjusted by reference to the indicator structure so as to provide irrigation water delivery sufficient to replace but not significantly exceed crop evapotranspiration of water at the selected region for a crop growing at the selected region.

38. An apparatus as set forth in claim 37, wherein the catch pan further includes a divider wall separating the basin into a rain water receiving portion and an irrigation water receiving portion, the divider wall extending from the floor to above the open top of the overflow construction, the relative sizes of the basin on each side of the divider wall and the height of the divider wall being selected to provide the desired replacement of water evapotranspired from the selected region.

39. An apparatus as set forth in claim 38, wherein the overflow construction communicates with the irrigation water receiving portion of the basin.

40. An apparatus as set forth in claim 39, wherein the airflow adjusting system is adjusted so as to control the relative rates of evaporation from the rain water receiving portion and from the irrigation water receiving portion of the catch pan.

41. An apparatus as set forth in claim 38, wherein the airflow adjusting system is adjusted so as to control the relative rates of evaporation from the rain water receiving portion and from the irrigation water receiving portion of the catch pan.

42. An apparatus as set forth in claim 23, wherein the cover structure comprises:
   an enclosure having a wall structure having a lower portion and an upper portion, the enclosure having an air entrance in the lower portion and an air exit in the upper portion; and wherein:
   the enclosure and the catch pan are so aligned and constructed as to direct air flow within the enclosure from the air entrance, across the surface of water present in the basin and out the air exit.

43. An apparatus as set forth in claim 23, further including:
   a drain structure for returning water which exits the overflow construction to the environment.

44. An apparatus as set forth in claim 23, further including:
   a support structure for supporting the catch pan a selected distance above ground level.

45. A timer activated irrigation system which comprises:
   a timing mechanism adapted to activate one or more valves on a timed basis to deliver irrigation water; and
   a control apparatus comprising:
      a catch pan, the catch pan having a vertically extending wall portion and a floor, the wall portion extending a selected distance above the floor to define a top of the wall portion, the wall portion and the floor defining a basin adapted to receive water, the catch pan having an overflow construction having an open top above the floor into which water from the basin can flow, a first portion of the catch pan being pivotally mounted for pivoting about a substantially horizontal axis and a second portion of the catch pan being spaced apart from the first portion;
      a biasing structure adapted to bias the second portion of the catch pan upwardly, the biasing structure being of a construction such that when water in the basin is below a selected depth the second portion of the catch pan rotates upwardly into a first orientation and when water in the basin is at least the selected depth the second portion of the catch pan rotates downwardly into a second orientation;
      a rain collecting structure adapted for collecting rain from a portion of a selected region and for delivering the rain to the basin;
      an irrigation water collecting structure adapted for collecting a portion of irrigation water during delivery of irrigation water to the region when it is being irrigated and for delivering the portion of the irrigation water to the basin;
      a cover structure of a construction sufficient to prevent rain water from flowing into the basin other than via the rain collecting structure; and
      a control structure adapted to control the amount of irrigation water delivered by the system as a function of the actual evapotranspiration at an irrigation site, the control structure operating in response to the positioning of the second portion of the catch pan.

46. A control apparatus for controlling a timer activated irrigation system, the control apparatus comprising:
   a catch pan, the catch pan having a vertically extending wall portion and a floor, the wall portion extending a selected distance above the floor to define a top of the wall portion, the wall portion and the floor defining a basin adapted to receive water, the catch pan having an overflow construction having an open top above the floor into which water from the basin can flow, a first portion of the catch pan being pivotally mounted for pivoting about a substantially horizontal axis and a second portion of the catch pan being spaced apart from the first portion;
   a biasing structure adapted to bias the second portion of the catch pan upwardly, the biasing structure being of a construction such that when water in the basin is below a selected depth the second portion of the catch pan rotates upwardly into a first orientation and when water in the basin is at least the selected depth the second portion of the catch pan rotates downwardly into a second orientation;
   a rain collecting structure adapted for collecting rain from a portion of a selected region and for delivering the rain to the basin;
   an irrigation water collecting structure adapted for collecting a portion of irrigation water during delivery of irrigation water to the region when it is being irrigated and for delivering the portion of the irrigation water to the basin;
   a cover structure of a construction sufficient to prevent rain water from flowing into the basin other than via the rain collecting structure; and
   a switching structure having a first mode which permits activation of the irrigation system and a second mode which prevents activation of the irrigation system, the switching structure being switched into the first mode in response to the second portion of the catch pan being rotated upwardly into the first orientation and into the second mode in response to the second portion of the catch pan being rotated downwardly into the second orientation.

47. An apparatus as set forth in claim 46, further including:
   an airflow adjusting system for controlling the amount of air which flows into contact with the water in the basin.

48. An apparatus as set forth in claim 47, wherein the airflow adjusting system includes:
   a cover mounted to the catch pan in at least partial covering relation to the basin, the cover having an incoming air valving structure therethrough for controlling the amount of air which flows into the basin and across an exposed surface of the water in the basin and a main air egress hole through which air flows out of the basin and is returned to the surrounding-atmosphere, the incoming air valving structure extending through the cover.

49. An apparatus as set forth in claim 48, wherein the airflow adjusting system further includes:
   a tubular member mounted to extend downwardly into said air egress hole and having a lumen through which the air flowing out of the basin can flow;
   an egress valve controlling the amount of air which can flow through the lumen; and
   a bypass valve through which air can flow and be returned to the atmosphere without passing across the surface of the water in the basin.

50. An apparatus as set forth in claim 47, further including:

an indicator structure of a construction sufficient and arranged to indicate the cumulative ET reading at the selected region.

51. An apparatus as set forth in claim 50, wherein the airflow adjusting system is adjusted by reference to the indicator structure so as to provide irrigation water delivery sufficient to replace but not significantly exceed crop evapotranspiration of water at the selected region for a crop growing at the selected region.

52. An apparatus as set forth in claim 51, wherein the catch pan further includes a divider wall separating the basin into a rain water receiving portion and an irrigation water receiving portion, the divider wall extending from the floor to above the open top of the overflow construction, the relative sizes of the basin on each side of the divider wall and the height of the divider wall being selected to provide the desired replacement of water evapotranspired from the selected region.

53. An apparatus as set forth in claim 52, wherein the overflow construction communicates with the irrigation water receiving portion of the basin.

54. An apparatus as set forth in claim 53, wherein the airflow adjusting system is adjusted so as to control the relative rates of evaporation from the rain water receiving portion and from the irrigation water receiving portion of the catch pan.

55. An apparatus as set forth in claim 52, wherein the airflow adjusting system is adjusted so as to control the relative rates of evaporation from the rain water receiving portion and from the irrigation water receiving portion of the catch pan.

56. An apparatus as set forth in claim 47, wherein the cover structure comprises:

an enclosure having a wall structure having a lower portion and an upper portion, the enclosure having an air entrance in the lower portion and an air exit in the upper portion; and wherein:

the enclosure and the catch pan are so aligned and constructed as to direct air flow within the enclosure from the air entrance, across the surface of water present in the basin and out the air exit.

57. An apparatus as set forth in claim 56, wherein the airflow adjusting system includes:

a cover mounted to the catch pan in at least partial covering relation to the basin, the cover having an incoming air valving structure therethrough for controlling the amount of air which flows into the basin and across an exposed surface of the water in the basin and a main air egress hole through which air flows out of the basin and is returned to the surrounding atmosphere, the incoming air valving structure extending through the cover.

58. An apparatus as set forth in claim 57, wherein the airflow adjusting system further includes:

a tubular member mounted to extend downwardly into said air egress hole and having a lumen through which the air flowing out of the basin can flow;

an egress valve controlling the amount of air which can flow through the lumen; and a bypass valve through which air can flow and be returned to the atmosphere without passing across the surface of the water in the basin.

59. An apparatus as set forth in claim 56, further including:

an indicator structure of a construction sufficient and arranged to indicate the cumulative ET reading at the selected region.

60. An apparatus as set forth in claim 59, wherein the airflow adjusting system is adjusted by reference to the indicator structure so as to provide irrigation water delivery sufficient to replace but not significantly exceed crop evapotranspiration of water at the selected region for a crop growing at the selected region.

61. An apparatus as set forth in claim 60, wherein the catch pan further includes a divider wall separating the basin into a rain water receiving portion and an irrigation water receiving portion, the divider wall extending from the floor to above the open top of the overflow construction, the relative sizes of the basin on each side of the divider wall and the height of the divider wall being selected to provide the desired replacement of water evapotranspired from the selected region.

62. An apparatus as set forth in claim 61, wherein the overflow construction communicates with the irrigation water receiving portion of the basin.

63. An apparatus as set forth in claim 52, wherein the airflow adjusting system is adjusted so as to control the relative rates of evaporation from the rain water receiving portion and from the irrigation water receiving portion of the catch pan.

64. An apparatus as set forth in claim 61, wherein the airflow adjusting system is adjusted so as to control the relative rates of evaporation from the rain water receiving portion and from the irrigation water receiving portion of the catch pan.

65. An apparatus as set forth in claim 46, wherein the cover structure comprises:

an enclosure having a wall structure having a lower portion and an upper portion, the enclosure having an air entrance in the lower portion and an air exit in the upper portion; and wherein:

the enclosure and the catch pan are so aligned and constructed as to direct air flow within the enclosure from the air entrance, across the surface of water present in the basin and out the air exit.

66. An apparatus as set forth in claim 46, further including:

a drain structure for returning water which exits the overflow construction to the environment.

67. An apparatus as set forth in claim 46, further including:

a support structure for supporting the catch pan a selected distance above ground level.

* * * * *